(No Model.) 2 Sheets—Sheet 1.

D. W. SHARES.
HARROW.

No. 365,104. Patented June 21, 1887.

WITNESSES:
George L. Barnes
John C. Gallagher.

INVENTOR
Daniel W Shares
BY Julius Truiss.
ATTORNEY (No Model.) 2 Sheets—Sheet 2.

D. W. SHARES.
HARROW.

No. 365,104. Patented June 21, 1887.

WITNESSES:
George L. Barnes
John C. Gallagher

INVENTOR
Daniel W. Shares
BY
Julius Tivies,
ATTORNEY

UNITED STATES PATENT OFFICE.

DANIEL W. SHARES, OF NEW HAVEN, CONNECTICUT.

HARROW.

SPECIFICATION forming part of Letters Patent No. 365,104, dated June 21, 1887.

Application filed January 25, 1887. Serial No. 225,485. (No model.)

*To all whom it may concern:*

Be it known that I, DANIEL W. SHARES, a citizen of the United States of America, residing at New Haven, in the county of New Haven and State of Connecticut, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention has for its object to provide an improved harrow of that class in which right and left handed colter-teeth or scrapers are used and arranged respectively in separate forward and rear gangs or series connected by a single draft-bar.

The invention consists in the novel arrangement and combination of the gang-bars, whereby each series of teeth may be turned in either direction diagonal to the line of draft and inclined from a horizontal plane in the line of motion to vary the longitudinal angle of the teeth with the ground.

The improvement further consists in inclining the teeth from a vertical plane laterally to rake in the direction of their cut, and in the novel shape of the teeth, whereby they may be formed from sheet metal without waste, all as hereinafter more particularly described and claimed.

Figure 1:
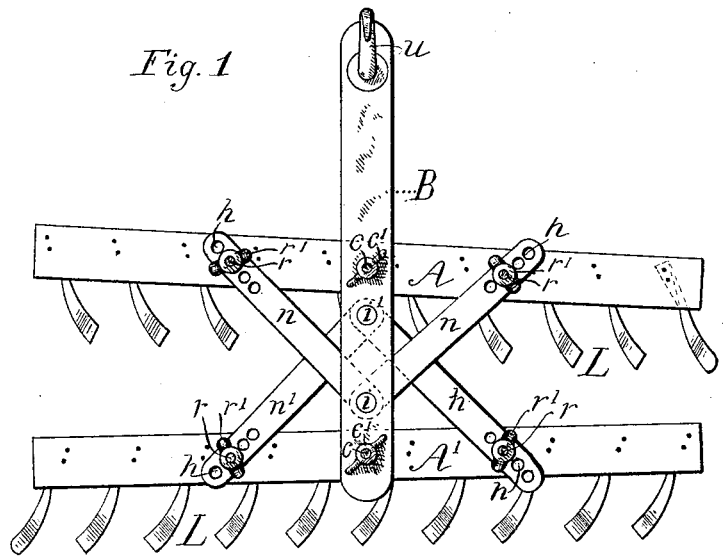
Figure 2:
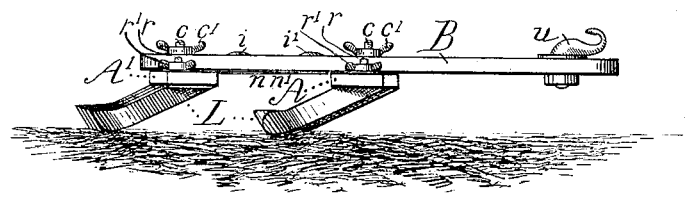
Figure 3:
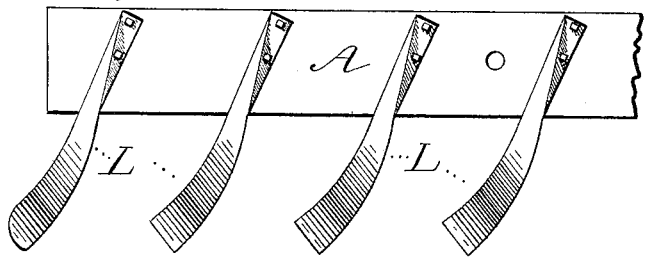
Figure 4:
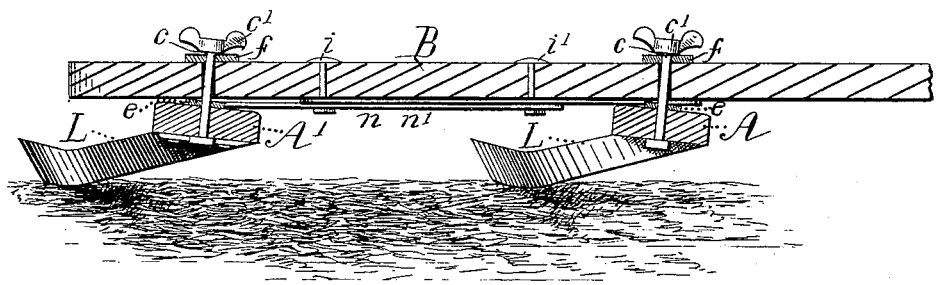
Figure 5:
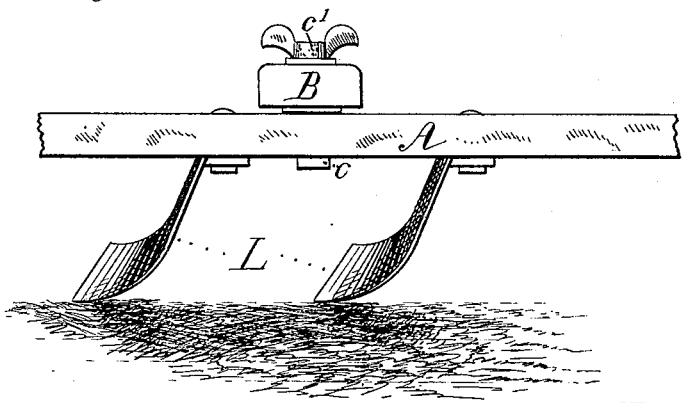
Figures 6, 7:
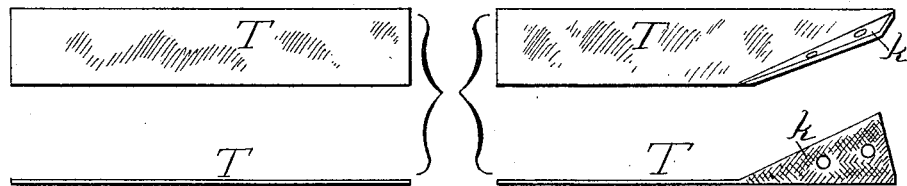
Figure 8:
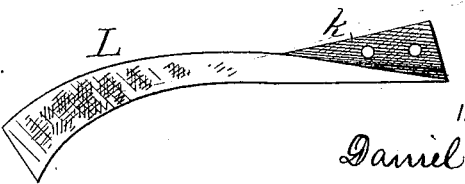

In the accompanying drawings, Figure 1 is a plan view of my improved harrow, and Fig. 2 is a side view of the same. Fig. 3 is a view of the lower side of a part of one of the gang-bars, showing the mode of attaching the colter-teeth or scrapers. Fig. 4 is a longitudinal section centrally along the draft-bar, showing the mode of tipping the teeth with respect to the surface of the field. Fig. 5 is a front view of a portion of one of the gang-bars, showing the lateral inclination of the teeth; and Figs. 6, 7, and 8 show details of the construction of the harrow-teeth from the rectangular blanks of sheet metal.

Referring to the drawings, A designates the forward gang-bar of my improved harrow, and A' denotes the rear gang-bar, each preferably made of hard wood and planed smooth. Both bars are pivoted to the under side of a single draft-beam, B, by means of vertical bolts C and suitable thumb-nuts, C'. The bolts are driven tightly through the gang-bars and are fitted loosely through the draft-beam, with the thumb-nuts bearing upon the upper side thereof. This construction allows the gang-bars to tip or incline from the horizontal position when the thumb-nut is not screwed up tightly, for the purpose of adapting the harrow to different grades of work, as hereinafter more fully described.

Thick washers $e$ are preferably placed between the gang-bars and draft-beam to more readily permit the inclination above referred to, and suitable washers, $f$, are also placed under the thumb-nuts to prevent abrasion of the wood. The gang-bars are arranged transversely to the draft-beam, and are held in place by means of two pairs of braces, $n\,n'$. The forward pair of braces, $n$, is arranged one upon either side of the draft-beam, with their forward ends pivoted to the forward gang-bar by means of the bolts $r$, secured by thumb-nuts $r'$, and their rear ends fastened by a single bolt, $i$, near the rear gang-bar. The rear pair of braces, $n'$, is similarly attached to the rear gang-bar and to a single bolt, $i'$, in the draft-beam near the forward gang-bar.

If desired, all four braces may be attached to a single bolt in the draft-beam half-way between the bars, or two braces alone may be used, one for each bar; but the construction shown gives greater strength, and is preferable, unless the gang-bars are placed farther apart than shown in the drawings.

The braces are provided with a series of holes, $h$, at the ends, which are attached to the gang-bars, to receive the bolts $r$, whereby the gang-bars may be adjusted at different angles to the draft-beam. To the lower side of each gang-bar a series of colter-teeth or curved scrapers, L, are secured, all of uniform size and curvature. The respective series or gangs of teeth are curved in opposite directions, so that one series throws the soil to the right and the other to the left, thus avoiding lateral draft upon the harrow, and more completely disintegrating the soil. The teeth are set slightly diagonal to a cross-sectional plane through the gang-bar, as shown, so that if the gang-bars were set at right angles to the draft-beam the teeth would be dragged partly sidewise, with the concaved side foremost. The teeth are also set at a lateral inclination to a vertical plane, as shown in Fig. 5, so that the cutting-edges of the teeth rake forward, and thus tend to draw into the soil and loosen it to a greater depth than if they were set vertical. The teeth are also inclined from the horizontal in the direction of their length, as shown in Fig. 2, so that the rear or curved end of the tooth sinks the deepest into the earth. This inclination, however, of the tooth may be varied by unscrewing the thumb-screws $c'$ $r'$, and thus allowing the gang-bar to tip and permit the tooth to approach a horizontal position, as shown in Fig. 4, whereby the cutting-edge bears upon the ground over a greater length and does not scrape as deeply as when the gang-bars are clamped up tightly, as shown in Fig. 2.

The longitudinal inclination of the teeth to the line of draft above referred to may also be varied at will by turning the gang-bars around upon the draft-beam and securing the bolts $r$ in different holes $h$ in the braces. If the gang-bars are turned so as to throw the ends shown most widely separated in Fig. 1 farther apart, the teeth will then draw nearly in line with the line of draft, and the action of the harrow will correspond more nearly to that of the common spike-toothed harrow. If the gang-bars are turned in the opposite direction, then the teeth will scrape the ground and operate as a series of plows. In each of these actions the depth to which the scrapers act may be regulated or controlled by changing the horizontal angle of the gang-bars with the draft-beam, as above described, and thus any grade of harrowing may be obtained, according to the nature of the soil, the kind of seed to be sown, or whether it is required to plow for leveling, to uproot weeds, to crush clods, to disintegrate the soil for the reception of grain, or to cover the same.

It will be observed that the longitudinal inclination of each series of teeth may be varied independently of the other, and hence one series may be set to act deeply and the other lightly, or both may be allowed to trail at the same angle. As they are not linked together so as to swivel conjointly in opposite directions, one series is not depressed as the other is elevated, but each is susceptible of adjustment independent of the other, and both sets may be simultaneously arranged to cut deeply or scrape lightly. Either set of teeth may also be adjusted with reference to the line of draft independently of the other, so that the forward gang of cutters may be set to plow broad furrows and the rear gang adjusted to scrape and level the furrows.

It will be seen that by allowing sufficient play in the bolt-holes of the draft-beam and sufficiently loosening the thumb-nuts $C'$ the cutters may be so inclined that they will trail their whole length.

In the construction of this harrow the respective sets of teeth are preferably bolted to the gang-bar, one directly in front of the other, so that the earth as it is pushed aside by the front series of teeth will be acted upon in an opposite direction by the rear series, and the teeth are placed sufficiently near each other to avoid uncultivated spaces.

Any kind of colter-teeth may be employed in this harrow; but I have devised a special form of tooth which may be made from rectangular pieces of sheet metal without waste and which is light and durable. This tooth is formed from a rectangular piece of steel, T, as shown in Fig. 6, and the blanks may therefore be cut without waste from either sheet metal or strips rolled to the width of the blanks. One corner of the piece of steel is next turned up nearly at right angles with the body of the blank, as shown in Fig. 7, to form a flange, $k$, for bolting the tooth to the gang-bar. The flange is then perforated for the reception of the bolts. The body of the blank is next bent to the curve required, as shown in Fig. 8. The preferred form of this curve is either that of a portion of the surface of a cylinder or of a cone. The end tooth, however, which projects laterally beyond the gang-bar, is preferably rounded off. This tooth is thus simple and cheap in construction and very advantageous.

The draft-beam is provided at its forward end with a hook, $u$, or other suitable means for attaching a chain, whiffletree, or evener for drawing the harrow.

If desired, a seat may be mounted upon the draft-beam midway over the respective gang-bars.

The teeth may be made of cast-iron; but they are preferably made of spring-steel, in which case their elasticity lessens their liability to break when brought into contact with stones and stumps while in use.

It is evident that the various adjustments provided for in this harrow enable the implement to act effectually under all the varied conditions and requirements of the successful cultivation of different soils and crops.

I claim as new and desire to secure by Letters Patent—

1. In a double harrow, the two gang-bars pivoted upon a single draft-beam so as to be capable of being swung in a horizontal plane, in combination with the adjusting-braces for holding the bars at various angles with reference to the draft-beam, a series of similarly-curved scrapers on one of the gang-bars, all curved in the same direction, and the series of scrapers on the other gang-bar, all curved in a direction opposite to that of the curvature of the scrapers on the other gang-bar, substantially as and for the purpose described.

2. In a colter-harrow, two gang-bars provided, respectively, with oppositely-curved teeth or scrapers, both pivoted loosely upon a single draft-beam, one behind the other, and held in position by adjusting-braces, each bar being adapted to turn in a horizontal plane upon the beam to vary the angle of the teeth with the line of draft and to tip transversely from the horizontal plane to vary the inclination of the teeth with the ground, substantially in the manner and for the purpose described.

3. In combination with the draft-beam B, the gang-bars pivoted to the beam, one behind the other, and each provided with a series of colter-teeth or curved scrapers, the two adjusting-braces $n\ n'$, pivoted at one end to the beam and at their other ends adjustably connected with one of the gang-bars on opposite sides of its pivotal attachment to the draft-beam, and two braces, also pivoted to the draft-beam at one end and at their other ends adjustably attached to the other gang-bar, substantially as and for the purpose described.

DANIEL W. SHARES.

Witnesses:
JULIUS TWISS,
GEORGE L. BARNES.